US012657499B2

(12) United States Patent
Kontos et al.

(10) Patent No.: US 12,657,499 B2
(45) Date of Patent: Jun. 16, 2026

(54) METHOD AND DEVICE FOR QUANTUM COMPUTING WITH MAJORANA MODES

(71) Applicants: CENTRE NATIONAL DE LA RECHERCHE SCIENTIFIQUE, Paris (FR); SORBONNE UNIVERSITE, Paris (FR); ECOLE NORMALE SUPERIEURE DE PARIS, Paris (FR); UNIVERSITÉ PARIS CITÉ, Paris (FR)

(72) Inventors: Takis Kontos, Paris (FR); Lauriane Contamin, Paris (FR); Matthieu Desjardins, Paris (FR); Matthieu Delbecq, Paris (FR); Audrey Cottet, Paris (FR)

(73) Assignees: CENTRE NATIONAL DE LA RECHERCHE SCIENTIFIQUE, Paris (FR); SORBONNE UNIVERSITE, Paris (FR); ECOLE NORMALE SUPERIEURE DE PARIS, Paris (FR); UNIVERSITÉ PARIS CITÉ, Paris (FR)

( * ) Notice: Subject to any disclaimer, the term of this patent is extended or adjusted under 35 U.S.C. 154(b) by 738 days.

(21) Appl. No.: 18/025,906

(22) PCT Filed: Sep. 14, 2021

(86) PCT No.: PCT/EP2021/075163
§ 371 (c)(1),
(2) Date: Mar. 12, 2023

(87) PCT Pub. No.: WO2022/058294
PCT Pub. Date: Mar. 24, 2022

(65) Prior Publication Data
US 2023/0376816 A1 Nov. 23, 2023

(30) Foreign Application Priority Data

Sep. 15, 2020 (FR) ...................................... 2009318

(51) Int. Cl.
*G06N 10/40* (2022.01)
(52) U.S. Cl.
CPC .................................. *G06N 10/40* (2022.01)
(58) Field of Classification Search
CPC ........ G06N 10/00; G06N 10/20; G06N 10/40; G06N 10/80; H10N 60/00
(Continued)

(56) References Cited

U.S. PATENT DOCUMENTS

| | | | |
|---|---|---|---|
| 10,346,348 B2 | 7/2019 | Hastings et al. | |
| 2022/0277216 A1* | 9/2022 | Casparis | G06N 10/40 |

OTHER PUBLICATIONS

Sato, et al., "Topological superconductors: a review", Reports on Progress in Physics, vol. 80, No. 7, 2017.
(Continued)

*Primary Examiner* — Paul Dinh
(74) *Attorney, Agent, or Firm* — Maier & Maier, PLLC

(57) ABSTRACT

A quantum computing device includes:
a microwave cavity (CH) having an input port (PE) and an output port (PS) that are separate or coincident;
a superconducting electronic device (DS) capacitively coupled to the microwave cavity and configured to support a chain of 2N *Majorana* modes ($MM_1$-$MM_4$, $MM_2$, $MM_3$,), N being a positive integer; and
coupling means for applying microwave excitations between each pair of adjacent *Majorana* modes of the chain.
It also relates to a method for producing a quantum braiding gate on a qubit by way of a quantum computing device.

9 Claims, 10 Drawing Sheets

(58) Field of Classification Search
USPC ........................................................ 716/100
See application file for complete search history.

(56) References Cited

OTHER PUBLICATIONS

Beenakker, "Search for non-Abelian Majorana braiding statistics in superconductors", SciPost Phys. Lect., Notes 15, 2020.

You, et al., "Encoding a qubit with Majorana modes in superconducting circuits", Scientific Reports, vol. 4, Article No. 5535, 2014.

Vijay, et al., "Braiding without Braiding: Teleportation-Based Quantum Information Processing with Majorana Zero Modes", Phys. Rev. B, vol. 94, 235446, 2016.

Göppl, et al. "Coplanar Waveguide Resonators for Circuit Quantum Electrodynamics", arXiv: 0807.4094v1, Jul. 25, 2008.

Karzig et al. "Scalable Designs for Quasiparticle-Poisoning-Protected Topological Quantum Computation with Majorana Zero Modes", Phys. Rev. B, vol. 95, 235305 2017.

Sau, et al., "Universal quantum computation in a semiconductor quantum wire network", Phys. Rev. A, vol. 82, 052322, 2010.

Cottet, et al., "Squeezing light with Majorana fermions", Phys. Rev. B, vol. 88, No. 19, pp. 195415-1-195415-10, Nov. 2013.

Kornich, et al., "Braiding and All Quantum Operations with Majorana Modes in 1D", arxiv.org., Cornell University Library, 2020.

Trif, et al., "Photon assisted braiding of Majorana fermions in a cavity", arxiv.org., Cornell University Library, 2018.

Hyart et al., "Flux-Controlled Quantum Computation with Majorana Fermions", Phys. Rev. B, XP55328037, Jul. 2013, vol. 88, arXiv:1303.4379v3, 20 pages.

Burkard et al., "Superconductor-Semiconductor Hybrid Cavity Quantum Electrodynamics", Nature Reviews Physics, XP81271901, 2019, Jan. 29, 2020, arxiv.org, 25 pages.

* cited by examiner

[Fig. 1]
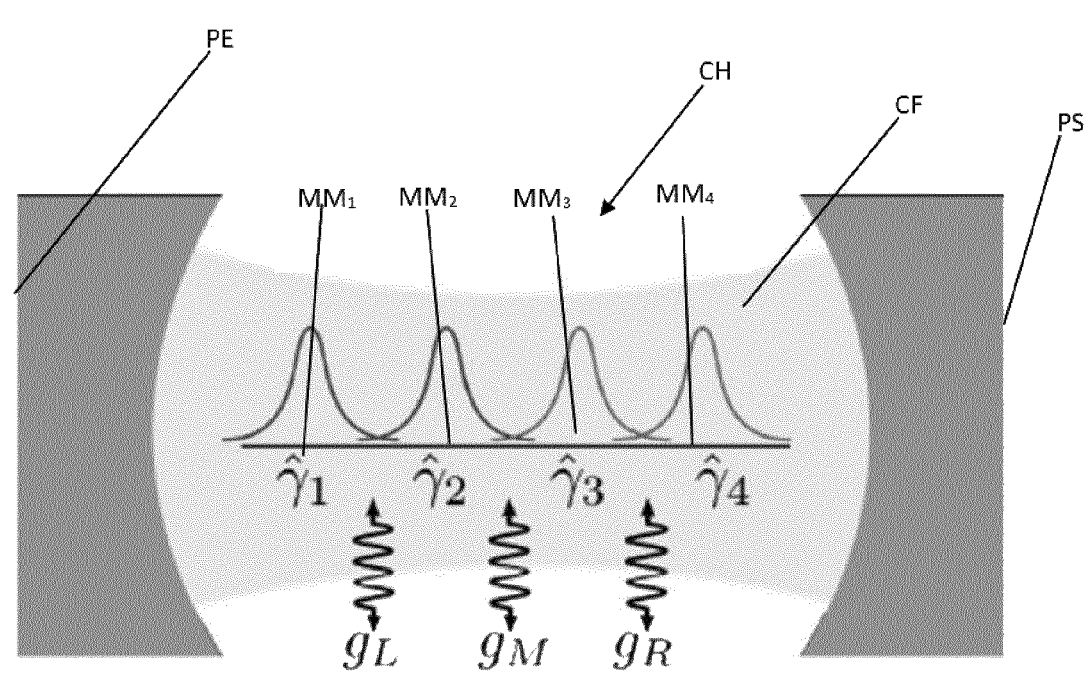
[Fig. 2A]
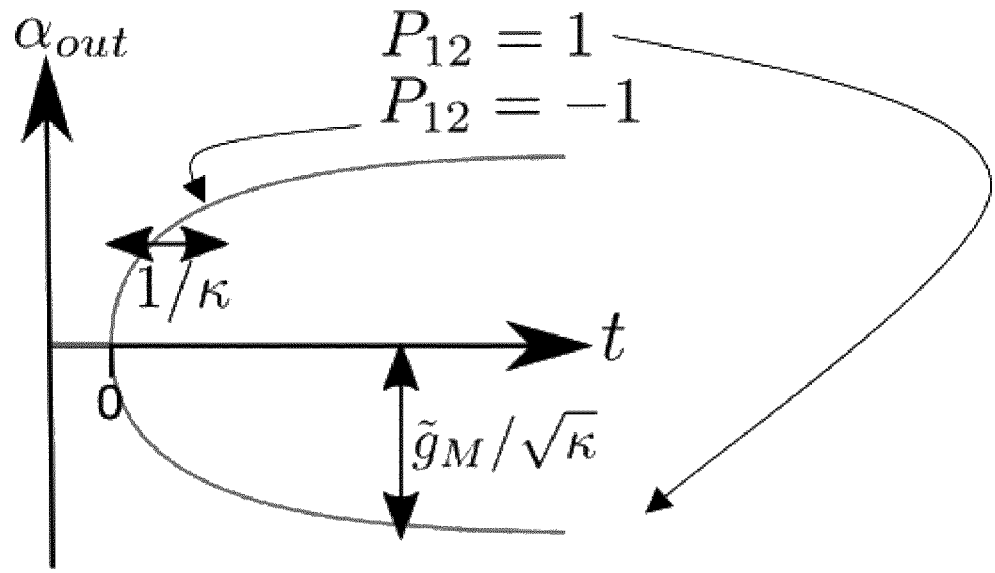

[Fig. 2B]
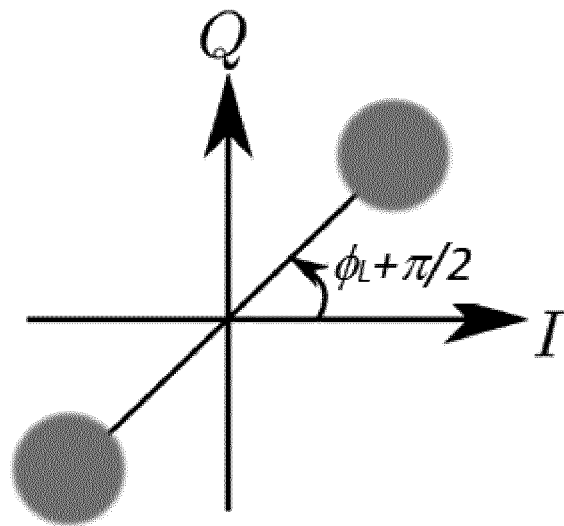
[Fig. 2C]
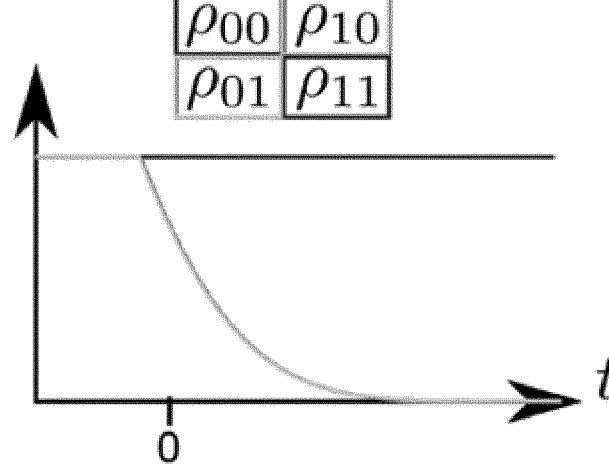

[Fig. 2D]
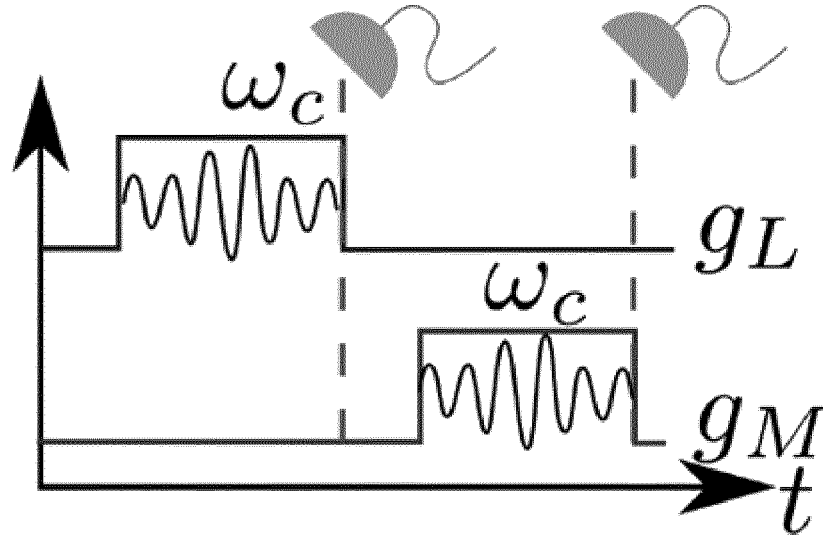
[Fig. 2E]
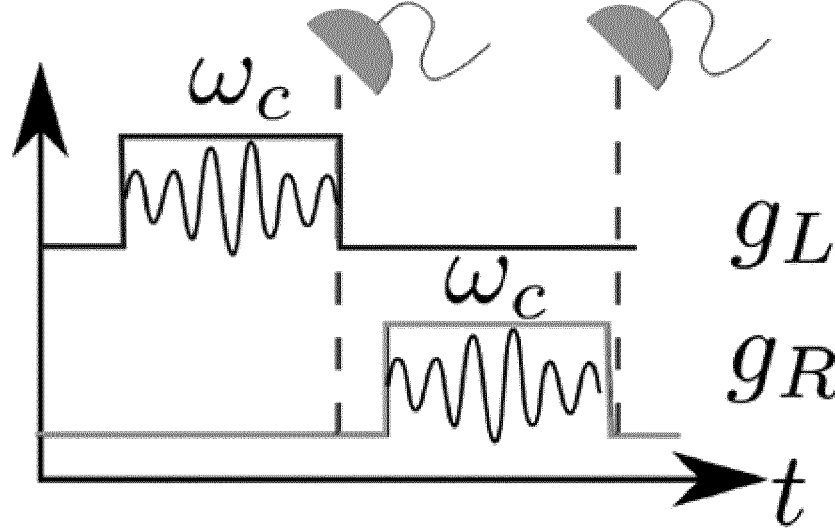

[Fig. 2F]
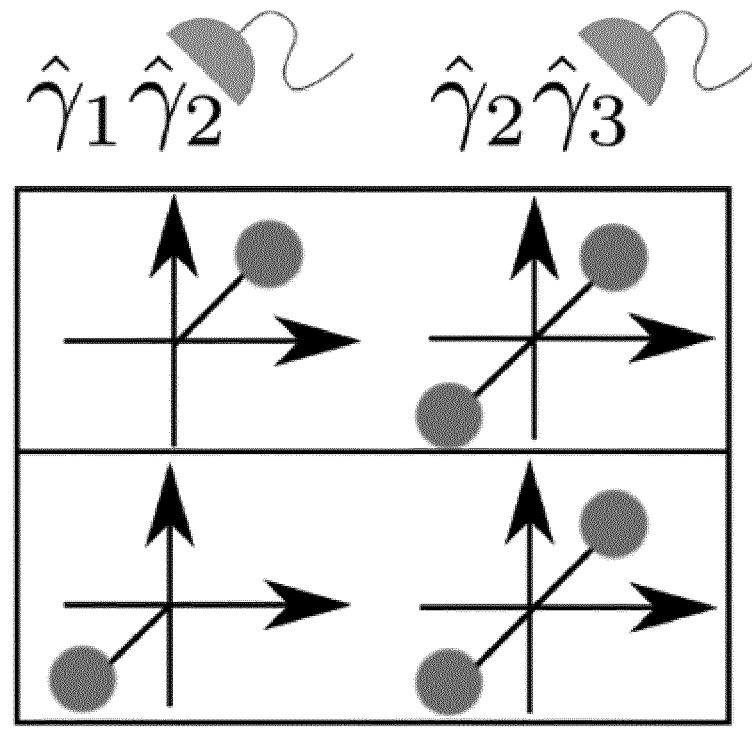
[Fig. 2G]
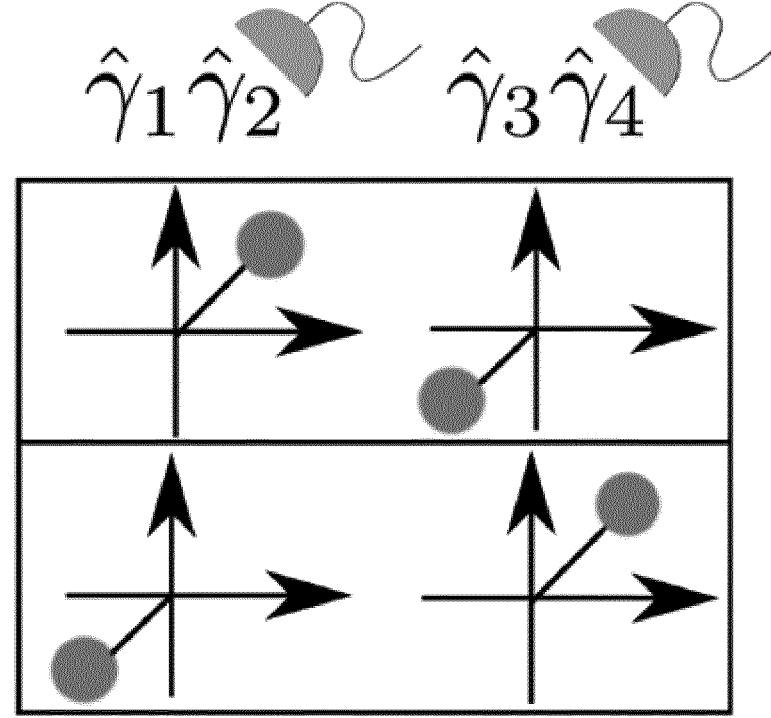

[Fig. 3A]
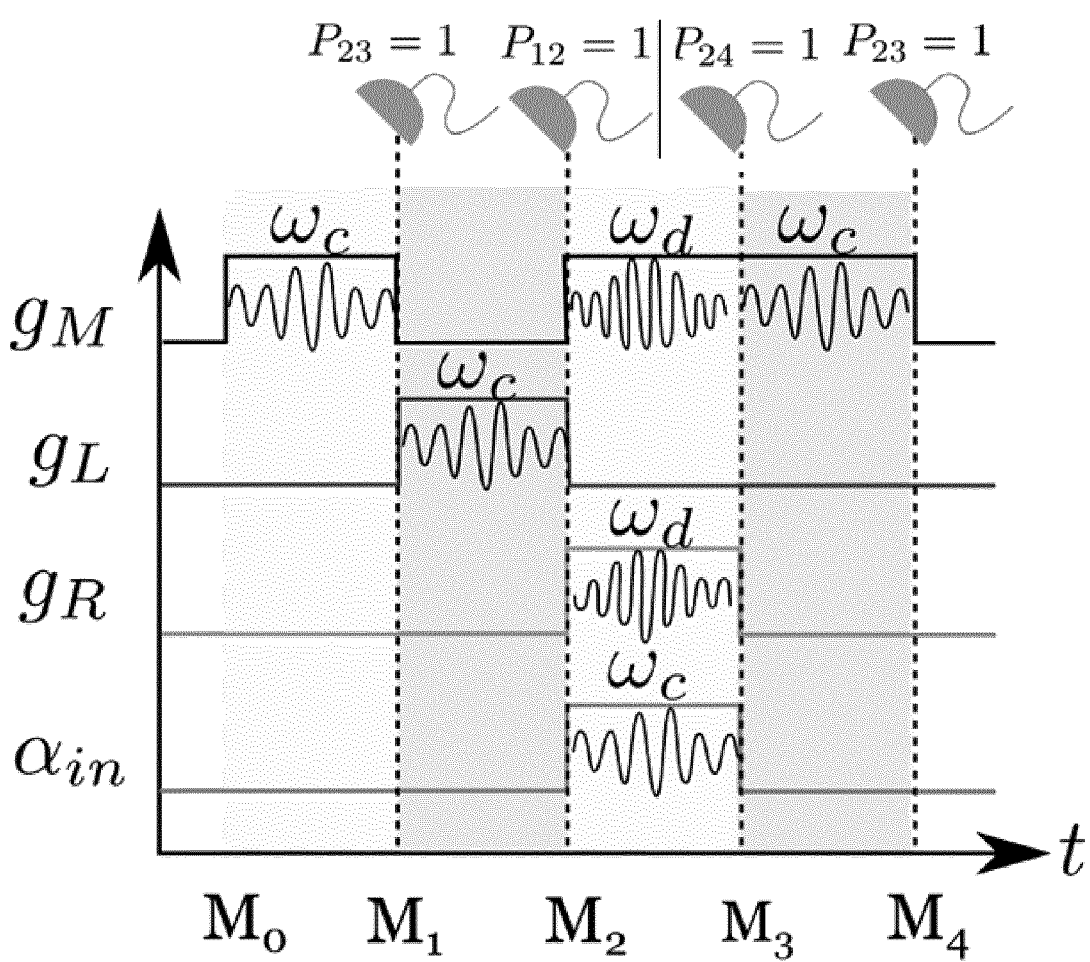

[Fig. 3B]
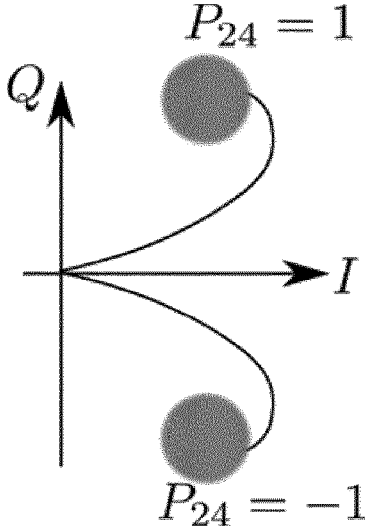
[Fig. 3C]
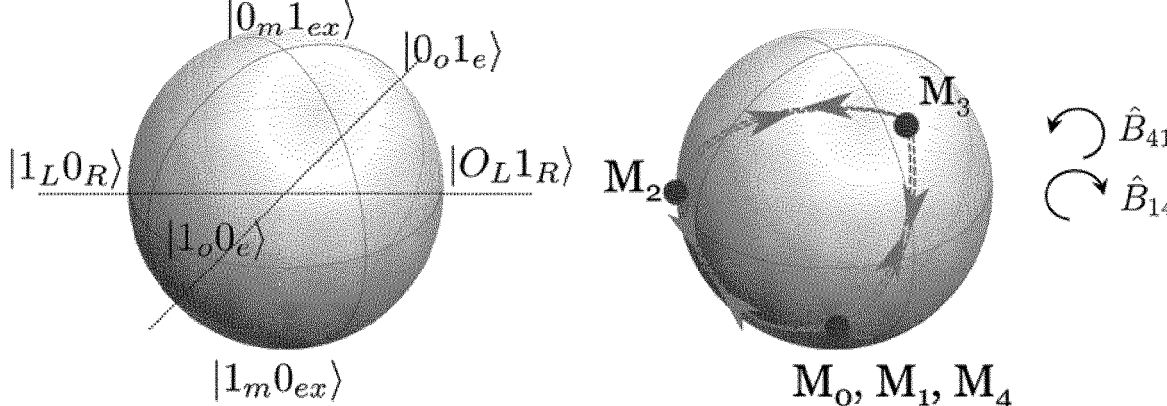

[Fig. 4]
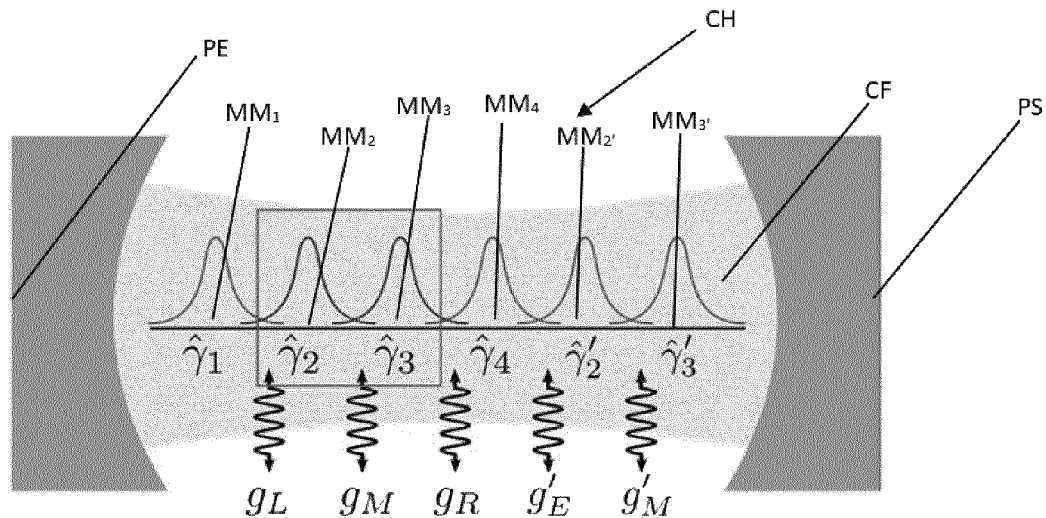
[Fig. 5A]
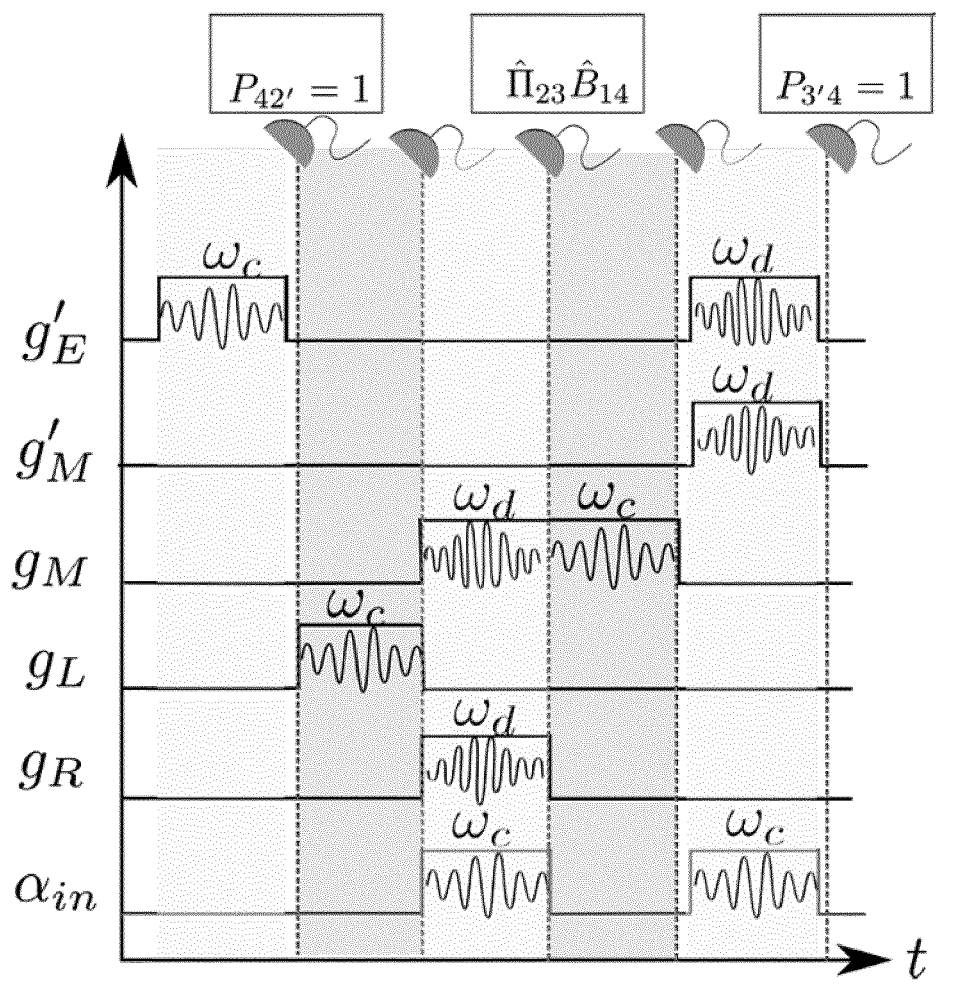

[Fig. 5B]
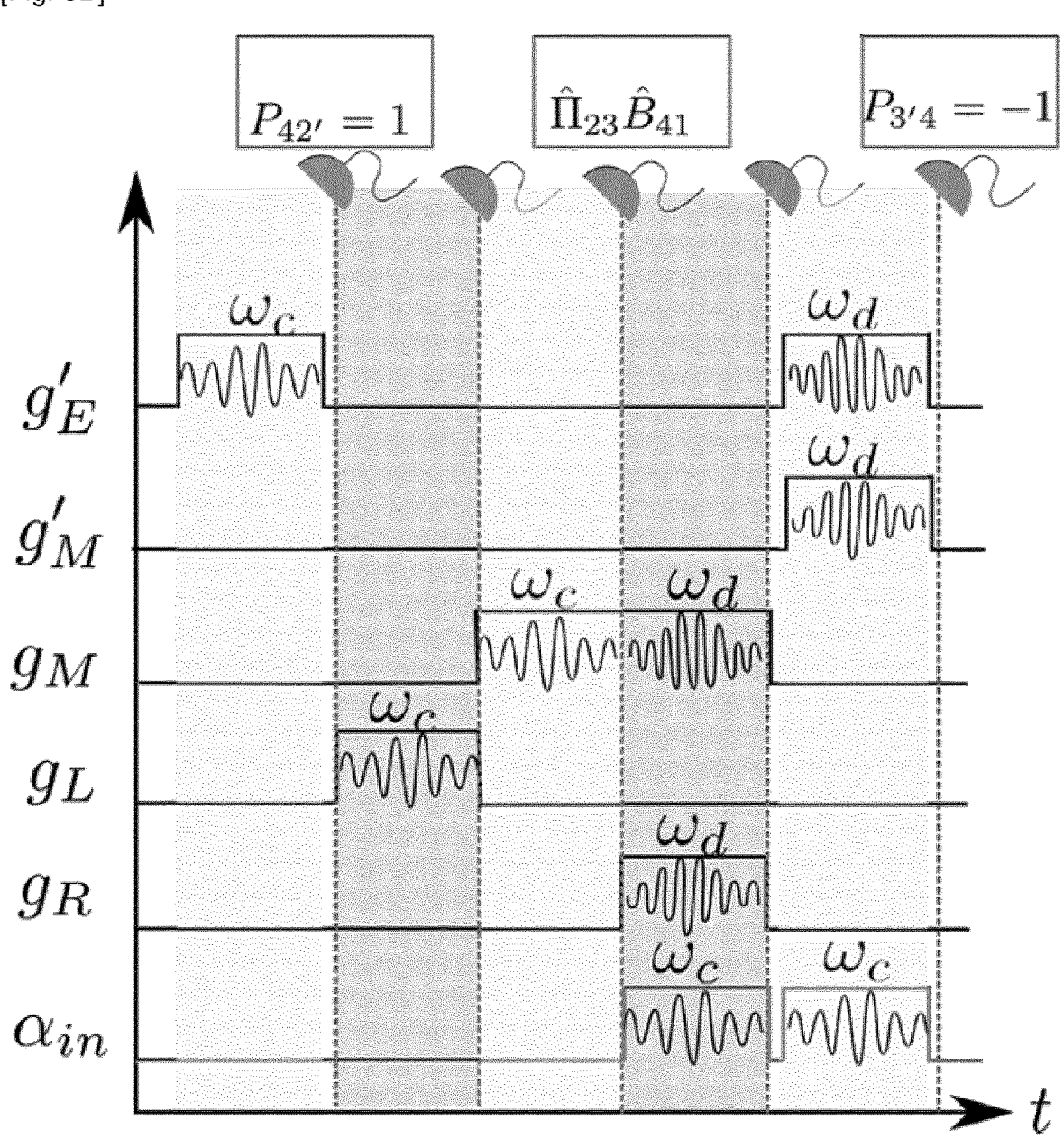

[Fig. 6]
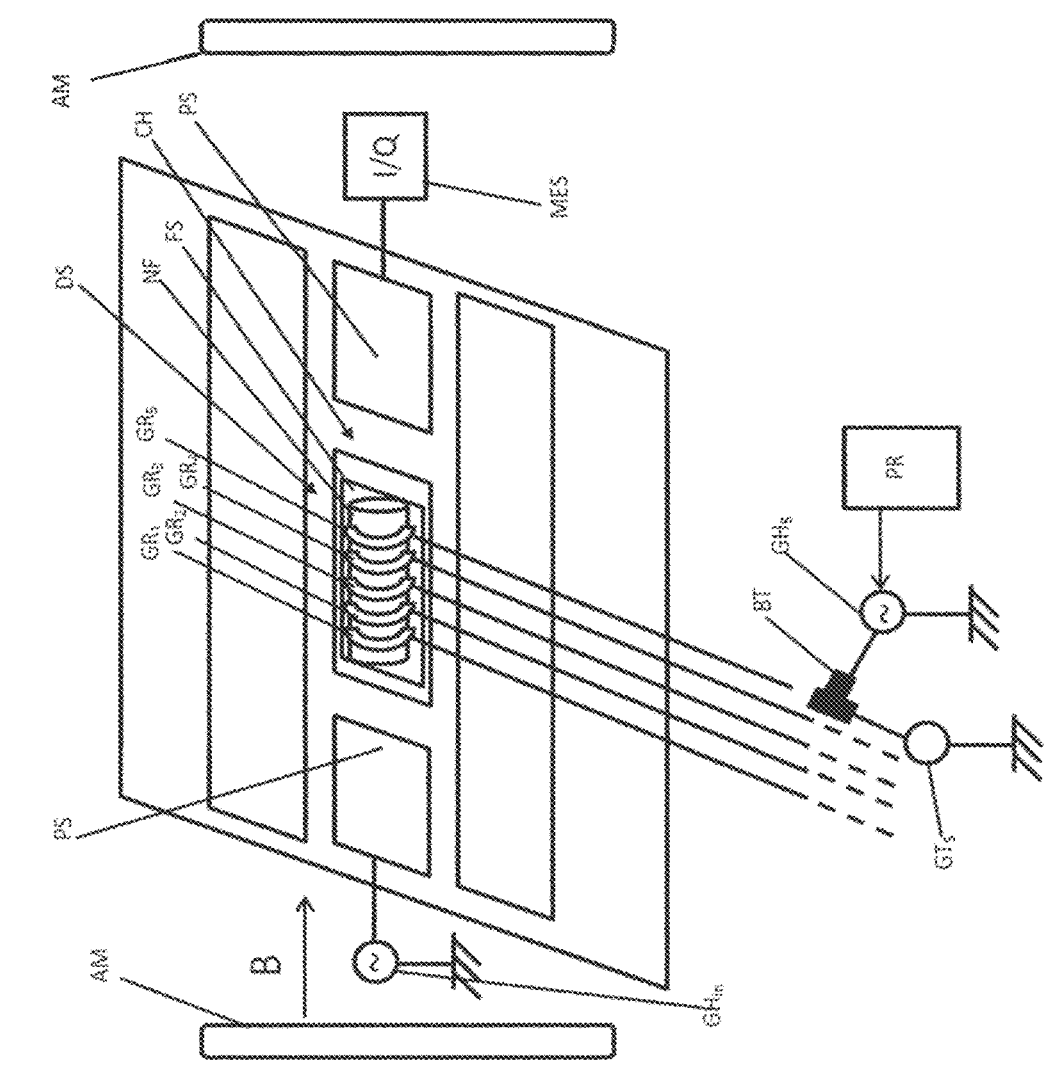

[Fig. 7]
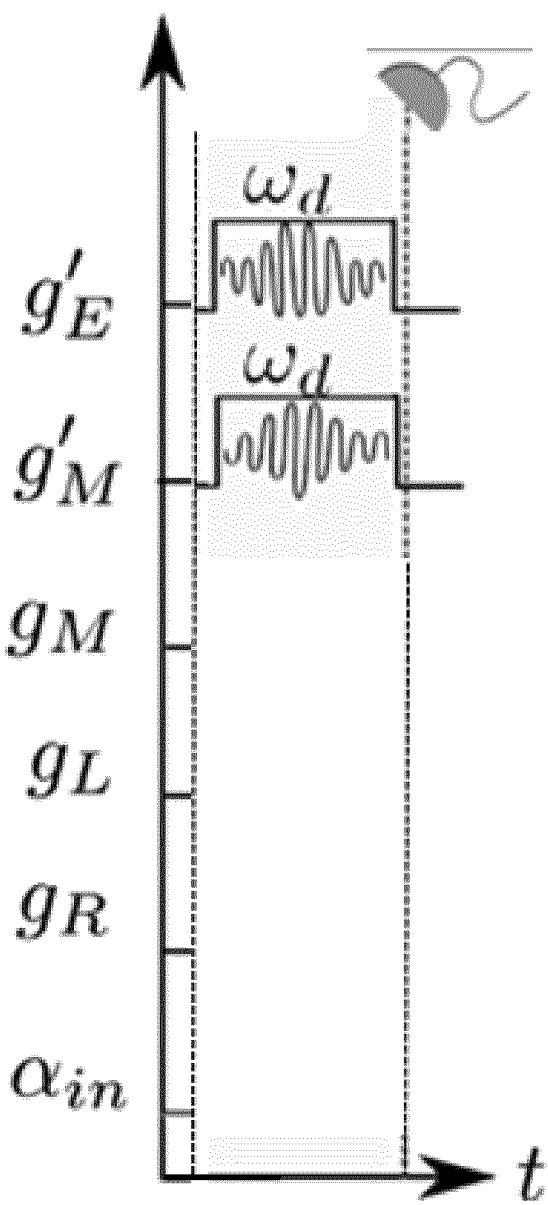

METHOD AND DEVICE FOR QUANTUM COMPUTING WITH MAJORANA MODES

CROSS-REFERENCE TO RELATED APPLICATIONS

This application is a National Stage of International patent application PCT/EP2021/075163, filed on Sep. 14, 2021, which claims priority to foreign French patent application No. FR 2009318, filed on Sep. 15, 2020, the disclosures of which are incorporated by reference in their entirety.

FIELD OF THE INVENTION

The invention lies in the field of quantum computing, and more generally of quantum information.

BACKGROUND

*Majorana* fermions are hypothetical spin-½ elementary particles that are their own antiparticle. More recently, this term—or expressions such as "*Majorana* states", "*Majorana* zero modes"—have been used to designate a specific type of quasi-particle in solids, and notably in topological superconductors. A *Majorana* mode corresponds to a zero-energy excitation (hence the term "zero mode") that may occur in particular in correspondence with a vortex in a topological superconductor.

By definition, a *Majorana* mode is represented by a self-adjoint operator:

$$\gamma_0^\dagger = \gamma_0$$

It will be understood that an isolated *Majorana* mode does not make it possible to define a creation or annihilation operator, since these two operators would coincide, which is contradictory. The difficulty may however be overcome by considering two *Majorana* modes, identified by indices (1) and (2). It is then possible to define operators $$c_{12}^\dagger = \frac{\gamma_0^{(1)} + i\gamma_0^{(2)}}{2}, \quad c_{12} = \frac{\gamma_0^{(1)} + i\gamma_0^{(2)}}{2} \tag{1}$$

that satisfy the usual anti-commutation relation of fermions:

$$\{c_{12}^\dagger, c_{12}\} = 1$$

and may therefore be considered, respectively, to be a creation and annihilation operator. Since two *Majorana* modes are needed to define a creation or annihilation operator, such a mode is generally said to constitute "a half-fermion".

The fact that a pair of separate modes is necessary to define the creation and annihilation operators of a fermion introduces a non-local quantum correlation between these modes, which drastically modifies their quantum nature. Therefore, the exchange of two *Majorana* modes (in real space or in an appropriate parameter space) produces a state of the same energy as the initial state that is related to the initial state not by a simple phase factor, as for bosons or fermions, but by a unitary transformation:

$$U_{ij} = \exp\left(-\frac{\pi}{4}\gamma_0^{(i)}\gamma_0^{(j)}\right)$$

If consideration is given to three *Majorana* modes with indices (1), (2) and (3) and consideration is given to the exchanges (1)-(2) and (2)-(3), it is possible to demonstrate that the operators $U_{12}$ and $U_{23}$ do not commute. It is then said that the exchange process is non-abelian.

*Majorana* mode exchanges are also called "braiding" operations because the world lines representing these modes in spacetime form a kind of braid.

It has been demonstrated that a set of four *Majorana* modes makes it possible to encode a qubit and that the braiding operations make it possible to produce quantum gates called "Clifford gates", which are useful for performing quantum computations. Other operations on *Majorana* modes also make it possible to manipulate qubits, notably to "fuse" them (which is equivalent to a projective measurement).

For a more detailed introduction to *Majorana* modes and to the application thereof to quantum computing, reference may be made to (Sato 2007) and to (Beenakker 2019).

*Majorana* modes are a particularly promising approach to producing a quantum computer since the braiding operations, given that they perform transformations between locally indistinguishable states, are protected from local sources of decoherence ("topological protection"). However, there are considerable obstacles to overcome to produce a *Majorana*-mode quantum processor.

It is for example known to implement *Majorana* modes based on a one-dimensional superconducting structure (nanowire) exhibiting strong spin-orbit coupling, see for example (Cottet 2013). However, the *Majorana*-mode exchange cannot be performed in a strictly one-dimensional geometry. More complex superconducting circuits, exhibiting a two-dimensional or grid geometry, have been proposed—see for example (You 2014) and (Vijay 2016)—but the implementation of such circuits encounters technological difficulties that are at present insurmountable.

(Kornich 2020) proposes to carry out braiding based on a one-dimensional arrangement of *Majorana* modes by utilizing transitions between said *Majorana* modes and the first excited level above them. One drawback of this approach is that it compromises topological protection, since the system is subject to relaxation when it is in the excited state.

SUMMARY OF THE INVENTION

The invention aims to overcome these drawbacks and to propose a *Majorana*-mode quantum computing device the implementation of which does not pose any major technological difficulties.

According to the invention, this object is achieved by coupling a preferably one-dimensional superconducting electronic device supporting *Majorana* modes to a microwave cavity and by using a photonic degree of freedom of the cavity to perform the braiding. Coupling a one-dimensional superconducting electronic device supporting *Majorana* modes to a microwave cavity has already been described in (Cottet 2013), but the use of this coupling to carry out braiding has not.

One subject of the invention is therefore a quantum computing device comprising:
- a microwave cavity having an input port and an output port that are separate or coincident;

a superconducting electronic device capacitively coupled to the microwave cavity and configured to support a chain of 2N *Majorana* modes, N being a positive integer; and coupling means for applying microwave excitations between each pair of adjacent *Majorana* modes of the chain.

According to Some Particular Embodiments:

The device may also comprise an electronic measurement circuit suitable for measuring at least one quadrature of a microwave field coming from the output port of the cavity.

The device may also comprise at least one microwave signal generator configured to generate:

microwave pulses at a first frequency resonant with the cavity; and microwave pulses at a second frequency not resonant with the cavity and to selectively apply these pulses to said coupling means and to the input port of the cavity.

N may notably be a multiple of 3, whereby the superconducting electronic device supports at least one group consisting of four *Majorana* modes capable of encoding a qubit plus two auxiliary *Majorana* modes. In this case, the device may also comprise an electronic control circuit configured or programmed to drive the microwave signal generator so as to:

a) apply a first microwave excitation at the first frequency between a fourth and a fifth *Majorana* mode from one end of the chain or from a portion of the chain comprising six *Majorana* modes; and then b) apply a second microwave excitation at the first frequency between a first and a second *Majorana* mode from said end; and then c) simultaneously apply a third microwave excitation at the second frequency between the second and a third *Majorana* mode from said end; a fourth microwave excitation at the second frequency between the third and the fourth *Majorana* mode, the third and the fourth microwave excitations exhibiting a phase shift; and a fifth microwave excitation at the first frequency to the input port of the cavity; and then d) apply a sixth microwave excitation at the first frequency between the second and the third *Majorana* mode; and then e) simultaneously apply a seventh microwave excitation at the second frequency between the fourth and the fifth *Majorana* mode; an eighth microwave excitation at the second frequency between the fifth and a sixth *Majorana* mode from said end; and a ninth microwave excitation at the first frequency to the input port of the cavity; the order of operations c) and d) being able to be swapped.

The electronic control circuit may be configured or programmed to drive the electronic measurement circuit so as to measure a component of the microwave field coming from the output port of the cavity in phase with the excitations at the first frequency after the application of each excitation or group of excitations.

The electronic control circuit may also be configured or programmed to drive the microwave signal generator so as to: simultaneously apply a ninth and a tenth microwave excitation at the second frequency between two adjacent pairs of adjacent *Majorana* modes, and to drive the electronic measurement circuit so as to measure two components of the microwave field coming from the output port of the cavity in phase and in quadrature with the excitations at the first frequency.

The superconducting electronic device may comprise a semiconductor nanowire exhibiting spin-orbit coupling, placed in correspondence with an antinode of the electric field of a mode of the cavity and on which a superconducting material is deposited, the device also comprising a magnet generating a magnetic field parallel to the nanowire.

The superconducting electronic device may also comprise 2N−1 electrodes for applying electrostatic potentials in order to generate the *Majorana* modes, said electrodes also constituting said coupling means for applying microwave excitations.

Another subject of the invention is a method for producing a quantum braiding gate on a qubit by way of such a quantum computing device, the method comprising the following steps:

a) applying a first microwave excitation at the first frequency between a fourth and a fifth *Majorana* mode from one end of the chain or from a portion of the chain comprising six *Majorana* modes; and then b) applying a second microwave excitation at the first frequency between a first and a second *Majorana* mode from said end; and then c) simultaneously applying a third microwave excitation at the second frequency between the second and a third *Majorana* mode from said end; a fourth microwave excitation at the second frequency between the third and the fourth *Majorana* mode; and a fifth microwave excitation at the first frequency to the input port of the cavity; and then d) applying a sixth microwave excitation at the first frequency between the second and the third *Majorana* mode; and then e) simultaneously applying a seventh microwave excitation at the second frequency between the fourth and the fifth *Majorana* mode; an eighth microwave excitation at the second frequency between the fifth and a sixth *Majorana* mode from said end; and a ninth microwave excitation at the first frequency to the input port of the cavity; the order of steps c) and d) being able to be swapped.

The method may also comprise measuring a component of the microwave field coming from the output port of the cavity in phase with the excitations at the first frequency after the application of each excitation or group of excitations.

A further subject of the invention is a method for producing a quantum T-gate on a qubit by way of a quantum computing device, the method comprising the following steps:

simultaneously applying two microwave excitations at the second frequency between two adjacent pairs of adjacent *Majorana* modes, and measuring two components of the microwave field coming from the output port of the cavity in phase and in quadrature with the excitations at the first frequency.

BRIEF DESCRIPTION OF THE DRAWINGS

Other features, details and advantages of the invention will become apparent on reading the description given with reference to the appended drawings, which are given by way of example and in which, respectively:

FIG. 1 shows a system of four *Majorana* modes in a microwave cavity;

FIG. 2A shows the output signal from the cavity as a function of time during an operation of fusing two *Majorana* modes of the system of FIG. 1;

FIG. 2B shows a representation in the I/Q plane of the photon field in the cavity during said fusion operation;

FIG. 2C shows the evolution of the density matrix of the superconducting device as a function of time during said fusion operation;

FIG. 2D and FIG. 2E show two sequences of microwave pulses for carrying out said fusion operation and a parity measurement;

FIG. 2F and FIG. 2G show the states of the photon field of the cavity during the sequences of figures FIG. 2D and FIG. 2E, respectively;

FIG. 3A shows a sequence of microwave pulses for carrying out a braiding operation on the *Majorana* modes of the system of FIG. 1;

FIG. 3B shows the evolution of the photon field of the cavity during the third pulse of the sequence of figure FIG. 3A;

FIG. 3C shows the evolution of the system during said braiding operation on a Bloch sphere;

FIG. 4 shows the basic diagram of a device according to one embodiment of the invention, using six *Majorana* modes;

FIG. 5A and FIG. 5B show two sequences of alternating pulses for carrying out respective braiding operations on the *Majorana* modes of the system of FIG. 4;

FIG. 6 shows one physical exemplary embodiment of the device of FIG. 4; and FIG. 7 shows a sequence of pulses for carrying out a "T-gate" operation on the *Majorana* modes of the system of FIG. 4.

Hereinafter, the term "microwave" will denote the frequency range between 300 MHz and 300 GHz, and more particularly between 1 GHz and 100 GHz.

DETAILED DESCRIPTION

FIG. 1 shows a linear chain of four *Majorana* modes $MM_1$, $MM_2$, $MM_3$, $MM_4$, which may be implemented physically in a superconducting device, capacitively coupled to a microwave cavity CH, which may be represented by an individual photonic mode â of frequency $\omega_c$. Each *Majorana* mode is associated with a respective self-adjoint operator $\hat{\gamma}_1$, $\hat{\gamma}_2$, $\hat{\gamma}_3$, $\hat{\gamma}_4$. A superposition between adjacent *Majorana* modes generates energy shifts $\epsilon_L$, $\epsilon_M$, $\epsilon_R$ that decrease exponentially as the distance between *Majorana* modes increases. These energy shifts in principle break the topological protection but, as will be discussed later, it is possible to make them small enough to preserve the exponential scaling of the topological protection over a wide range of control parameters, thereby making it possible to implement the invention based on various existing technological platforms.

The low-energy Hamiltonian H of the system may be written as the sum of three terms: a term $H_{cav}$ represents the energy of the photon field of the cavity, a term $H_{el}$ represents the energy of the *Majorana* modes and a term $H_{int}$ represents the coupling between the latter and the cavity:

$$H = H_{el} = H_{int} = H_{cav}$$

$$H_{cav} = \hbar\omega_c \hat{a}^\dagger \hat{a}$$

-continued $$H_{el} = \hbar\left(i\epsilon_L \hat{\gamma}_1 \hat{\gamma}_2 + i\epsilon_M \hat{\gamma}_2 \hat{\gamma}_3 + i\epsilon_R \hat{\gamma}_3 \hat{\gamma}_4\right)$$

$$H_{int} = \hbar\left(ig_L \hat{\gamma}_1 \hat{\gamma}_2 + ig_M \hat{\gamma}_2 \hat{\gamma}_3 + ig_R \hat{\gamma}_3 \hat{\gamma}_4\right)\left(\hat{a} + \hat{a}^\dagger\right)$$

where â, $\hat{a}^\dagger$ are respectively the annihilation and creation operator of the photon field in the cavity and $g_L$, $g_M$ and $g_R$ are the coupling coefficients between pairs of adjacent *Majorana* modes and this photon field.

Based on the *Majorana* operators $\hat{\gamma}_1$, $\hat{\gamma}_2$, $\hat{\gamma}_3$, $\hat{\gamma}_4$ it is possible to define topological charges. For a chain of four *Majorana* modes, there are three ways of pairing these modes so as to form two topological charges corresponding to Fermionic creation operators:

$$\hat{c}_L = \frac{1}{2}(\hat{\gamma}_1 + i\hat{\gamma}_2) \text{ and } \hat{c}_R = \frac{1}{2}(\hat{\gamma}_3 + i\hat{\gamma}_4)$$

$$\hat{c}_m = \frac{1}{2}(\hat{\gamma}_2 + i\hat{\gamma}_3) \text{ and } \hat{c}_{ex} = \frac{1}{2}(\hat{\gamma}_1 + i\hat{\gamma}_4)$$

$$\hat{c}_o = \frac{1}{2}(\hat{\gamma}_1 + i\hat{\gamma}_3) \text{ and } \hat{c}_e = \frac{1}{2}(\hat{\gamma}_4 + i\hat{\gamma}_2)$$

The electron system may therefore be expressed in the bases $\{|0_i, 0_j\rangle, |1_i, 1_j\rangle, |0_i, 1_j\rangle, |1_i, 1_j\rangle\}$ where (i, j)∈{(L, R), (m, ex), (o, e)}. The parity operator associated with one of these topological charges is given by $\hat{P}_{ij}=i\gamma_i\gamma_j$.

It is then considered that the electron-photon coupling may be modulated at a frequency $\omega_{RF}$ in the microwave domain:

$g_O(t)=\bar{g}_O+\tilde{g}_O \cos(\omega_{RF}t+\phi_O)$ with O=L, M, R and $\phi_O$ being a phase, for example by way of gates (insulated electrodes) capacitively coupled to respective regions of the superconducting device (left, middle, right). The microwave excitation thereby modulates the coupling go via a modulation of the superposition between the *Majorana* modes, and therefore of the energy shifts:

$\epsilon_i(t)=\bar{\epsilon}_i+\tilde{\epsilon}_i \cos(\omega_{RF}t+\phi_i)$ where $\bar{\epsilon}_i$ is a constant term the value of which may be varied by applying a DC voltage to the gate (i=L, M, R).

An electromagnetic field CF develops in the cavity when a coupling coefficient, for example $g_L$, is modulated at the resonant frequency of the cavity: $\omega_{RF}=\omega_c$ This field is related directly to the parity of the left section of the chain of *Majorana* modes. The components $H_{el}$ and $H_{int}$ of the low-energy Hamiltonian may also be written:

$$H_{el} = i\hbar\epsilon_L(t)\hat{\gamma}_1 \hat{\gamma}_2$$

$$H_{int} = i\hbar g_L(t)\hat{\gamma}_1 \hat{\gamma}_2\left(\hat{a} = \hat{a}^\dagger\right)$$

The low-energy Hamiltonian may be rewritten in a reference frame rotating at the frequency $\omega_c$ neglecting a static term, proportional to $\bar{g}_L$ according to the rotating-wave approximation:

$$\tilde{H} = H_{el} + \frac{\hbar}{2}\tilde{g}_L\left(e^{i\phi_L}\hat{a}^\dagger + e^{-i\phi_L}\hat{a}\right)i\hat{\gamma}_1 \hat{\gamma}_2$$

This induces an effective coupling between the *Majorana* modes $MM_1$ and $MM_2$, which may be used to measure the parity $\hat{P}_{12}=i\hat{\gamma}_1\hat{\gamma}_2$ thereof through the field CF, as illustrated by figures FIG. 2A to FIG. 2G. It is therefore possible to fuse the *Majorana* modes $MM_1$ and $MM_2$ and to detect this fusion through the photons of the cavity, extracted via an output port PS (an input port PE, coincident with or separate from PS, is also provided in order to directly excite a mode of the cavity).

FIG. 2A shows the evolution over time t of the output signal $\alpha_{out}$ from the cavity, representative of the electromagnetic field excited therein, assuming that the modulation of the coupling $g_L$ starts at t=0. A transient is observed the duration of which is of the order of magnitude of $1/\kappa$, $\kappa$ being the line width of the cavity. The amplitude of the signal after the transient is $\widetilde{g_L}/\sqrt{\kappa}$. FIG. 2B shows a representation of the output field in the I/Q plane; it is noted that the position of the circular spot representing the coherent mode of the field depends on the parity, thereby allowing the latter to be measured, and on the phase $\phi_L$. The contrast, $\widetilde{g_L}/\sqrt{\kappa}$, may be much greater than the width of the spots even in a strongly topological regime ($\widetilde{g_L} \to 0$), provided that the cavity width is small enough.

Measuring the parity through the photons of the cavity, which makes it possible to fuse two *Majorana* modes, requires taking into account the other two *Majorana* modes, hitherto considered to be decoupled. By taking into account the other *Majorana* modes ($MM_3$, $MM_4$), the coupling between these modes and the cavity is no longer able to be considered purely longitudinal: there is also a transverse component of the coupling that induces a temporal evolution of the parity operator. However, this evolution may be neglected provided that $\epsilon_O$, $g_O \ll \omega_c$ for O=L, M, R, for example, $\epsilon_O$, $g_O \leq 0.1\omega_c$.

The consequences of the operation of fusing *Majorana* modes $MM_1$ and $MM_2$ on the additional modes $MM_3$, $MM_4$ are not trivial. Indeed, in the base of the two charges of the operators number $$\hat{n}_m = \frac{1}{2}(i\hat{\gamma}_2\hat{\gamma}_3 + 1), \hat{n}_{ex} = \frac{1}{2}(i\hat{\gamma}_1\hat{\gamma}_4 + 1),$$

the fusion operation projects the two charges into an entangled state:

$$|\Psi_+\rangle = |1_L 0_R\rangle = \frac{1}{\sqrt{2}}(|0_m 1_{ex}\rangle + |1_m 0_{ex}\rangle)$$

for $P_{12} = 1$ and $|\Psi_-\rangle = |0_L 1_R\rangle = \frac{1}{\sqrt{2}}(|0_m 1_{ex}\rangle - |1_m 0_{ex}\rangle)$ for $P_{12} = -1$.

Entanglement may be observed by measuring the central charge, which is carried out in the same way as in measurement-based fusion, as it involves measuring the parity associated with two adjacent *Majorana* modes, $MM_2$ and $MM_3$. At the same time, the projection expressed in the base of the charges $\hat{n}_L$, $\hat{n}_R$ rib gives a state vector; the measurement of the parity of the modes $MM_3$ and $MM_4$ is therefore deterministic.

FIG. 2C shows the temporal evolution of the four components $\rho_{00}$, $\rho_{10}$, $\rho_{01}$, $\rho_{11}$ of the density matrix of the chain of *Majorana* modes expressed in the base L, R. It may be seen that the starting state is an entangled state and that the coherences (elements off the diagonal of the matrix) cancel one another out during the projective measurement.

FIG. 2D and FIG. 2F respectively illustrate the sequence of microwave excitations and the sequence of measurements used to perform and measure the fusion of $MM_1$ and $MM_2$. First of all, $g_L$ is modulated at the frequency $\omega_c$ for a time greater than $1/\kappa$ (and typically less than $10/\kappa$, for example of the order of $3/\kappa$, because the maximum admissible duration of the measurement is limited by the parity lifetime) to perform the fusion, and a projective measurement is performed on the cavity field. Next, the parity $\hat{P}_{23} = i\hat{\gamma}_2\hat{\gamma}_3$ is measured by modulating $g_M$ at the frequency $\omega_c$ and by performing a second measurement of the cavity field. This second measurement, which is probabilistic, depends on the state in which the chain of *Majorana* modes was projected, $|\Psi_+\rangle$ or $|\Psi_-\rangle$.

As an alternative, it is possible to measure the parity $\hat{P}_{34}$ by way of the sequences of FIG. 2E and FIG. 2G. It is noted that, in this case, the second measurement of the field is deterministic.

If it is considered that $\kappa=1$ MHz, which is easily obtained for example with coplanar-waveguide cavities, the measurement duration is of the order of a few $\mu$s, which requires a parity lifetime of a few tens of $\mu$s. Charge-cavity couplings of the order of g=100 MHz may be obtained, which is compatible with the abovementioned condition $\epsilon_O$, $g_O \ll \omega_c$. Assuming that the strength of the coupling may be modulated by 10%, it is therefore possible to perform "single-shot" reading of the cavity without requiring electrical manipulations.

The fusion operation only requires measuring the parity operator between adjacent links of the linear chain of *Majorana* modes (a "link" being formed by a pair of adjacent *Majorana* modes) or, equivalently, activating coupling between adjacent pairs of such modes. Braiding is in principle more restrictive because it requires reading the parity corresponding to distant *Majorana* modes, for example $MM_2$ and $MM_4$. According to a widespread prejudice, this would require a two-dimensional or at least grid geometry, since it seems difficult to "jump over" a *Majorana* mode ($MM_3$, in this case) in a strictly one-dimensional geometry. One idea on which the present invention is based is that this is in fact made possible through the coupling with the microwave cavity, using two pulsed excitations to modulate the coupling coefficients $g_M$ and $g_R$. This effectively converts the one-dimensional system to a two-dimensional system through line-star mapping. This makes it possible to create dynamically reconfigurable two-dimensional arrays through the use of cavity photons.

Starting from the Hamiltonian $H_{el} = \hbar(i\epsilon_L\hat{\gamma}_1\hat{\gamma}_2 + i\epsilon_M\hat{\gamma}_2\hat{\gamma}_3 + i\epsilon_R\hat{\gamma}_3\hat{\gamma}_4)$, consideration is given to microwave excitations detuned with the cavity ($\omega_{RF} \neq \omega_c$) between the *Majorana* modes $MM_2$ and $MM_3$ and the *Majorana* modes $MM_3$ and $MM_4$. These excitations induce the following unitary transformation:

$$U = e^{i\omega_{RF}\hat{a}^\dagger \hat{a}t} e^{\left[\frac{g_M}{\omega_{RF}-\omega_c}\left(e^{i\phi_M}\hat{a}^\dagger + e^{-i\phi_M}\hat{a}\right)i\hat{\gamma}_2\hat{\gamma}_3 + \frac{g_R}{\omega_{RF}-\omega_c}\left(e^{i\phi_R}\hat{a}^\dagger + e^{-i\phi_R}\hat{a}\right)i\hat{\gamma}_3\hat{\gamma}_4\right]}$$

Thereby giving the following Hamiltonian:

$$H = \hbar(\omega_c - \omega_{RF})\hat{a}^\dagger \hat{a} + 8i\frac{g_M g_R}{\omega_{RF} - \omega_c}\sin(\phi_M - \phi_R)\hat{\gamma}_2\hat{\gamma}_4(\hat{a}^\dagger \hat{a} + 1/2)$$

More generally, considering a chain comprising an arbitrary number of *Majorana* modes, the use of a resonant cavity coupled longitudinally to said modes and of nonresonant excitations makes it possible to obtain an effective Hamiltonian having the form:

$$H_{\mathit{eff}} = \sum_{n,m} i\hat{\gamma}_n \hat{\gamma}_m f_{nm}(\hat{a}^\dagger, \hat{a}, \hat{a}^\dagger \hat{a}) + \hbar \delta \hat{a}^\dagger \hat{a}$$

where $f_{nm}$ is a linear function and $\delta = \omega_c - \omega_{RF}$ is the detuning between the excitation and the cavity. This shows that the system constituted by a chain of *Majorana* modes (regardless of its physical implementation) coupled longitudinally to a microwave cavity, with means (for example gates) for applying microwave excitations between adjacent *Majorana* modes, is equivalent to a 2D array, thereby allowing manipulations such as T-gates and, above all, braidings.

The protocol for carrying out the braiding $\hat{B}_{14}$ of the *Majorana* modes $MM_1$ and $MM_4$ is illustrated in FIG. 3A. First of all, from a state $M_0$ of the system, modulation, at the frequency $\omega_c$, of the coupling $g_M$ followed by reading of the cavity field makes it possible to read the parity $P_{23}$, after which the system is in a state $M_1$. For example, consideration is given to the case where $M_0=|1_m 0_{ex}\rangle$, in which case $P_{23}=1$ and $M_1=M_0$. Second of all, modulation, at the frequency $\omega_c$, of the coupling $g_L$ followed by reading of the cavity field makes it possible to read the parity $P_{12}$, after which the system is in a state $M_2$. In the example under consideration here, $P_{12}=1$ and $M_2=|1_L 0_R\rangle$. Third of all, a measurement of the parity $P_{24}$ is performed. This measurement concerns two non-adjacent *Majorana* modes, and it is more complex: it requires the modulation, at the frequency $(\omega_d \neq \omega_c)$, of the coupling $g_M$ and simultaneously, but with a phase shift (ideally of $\pi/2$, in any case other than 0 or an integer multiple of $\pi$) of the coupling $g_R$, and also the application of a resonant excitation $\alpha_{in}$ (at the frequency $\omega_c$) to the input port of the cavity. Following this measurement, the system is in a state $M_3$. In the chosen example, $M_3=|0_o 1_e\rangle$ and $P_{24}=1$. FIG. 3B shows the evolution of the field in the cavity in both cases $P_{24}=1$ and $P_{24}=-1$. Finally, a second measurement of the parity $P_{23}$ ($P_{23}=1$ in the example) brings the system into the state $M_4=M_0 e^{i\pi/4}$—in other words, the system accumulates a phase of $-\pi/4$.

FIG. 3C shows the evolution of the system on a Bloch sphere for the braiding $\hat{B}_{14}$ and for the braiding $\hat{B}_{41}$, which travels the same trajectory in the opposite direction and which leads to a $\pi/4$ phase accumulation. To sum up:

$$\hat{B}_{14}: |1_m 0_{ex}\rangle \xrightarrow{\hat{\Pi}_{23}} |1_m 0_{ex}\rangle \xrightarrow{\hat{\Pi}_{12}} i|1_L 0_R\rangle \xrightarrow{\hat{\Pi}_{24}} -e^{i\pi/4}|0_o 1_e\rangle \xrightarrow{\hat{\Pi}_{23}}$$
$$e^{-i\pi/4}|1_m 0_{ex}\rangle$$

$$\hat{B}_{41}: |1_m 0_{ex}\rangle \xrightarrow{\hat{\Pi}_{23}} |1_m 0_{ex}\rangle \xrightarrow{\hat{\Pi}_{24}} -i|0_o 1_e\rangle \xrightarrow{\hat{\Pi}_{12}} ie^{i\pi/4}|1_L 0_R\rangle \xrightarrow{\hat{\Pi}_{23}}$$
$$e^{i\pi/4}|1_m 0_{ex}\rangle$$

Where $\hat{\Pi}_{ij}$ is the operator that projects the state of the system onto the parity subspace $\hat{P}_{ij}=1$.

However, the protocol of FIG. 3A does not really make it possible to encode and manipulate a qubit, because the two charges $\hat{n}_m$ and $\hat{n}_{ex}$ are not independent. To overcome this difficulty, it is possible to resort to a chain of 6 *Majorana* modes, as illustrated in FIG. 4. This system is obtained by extending the chain of *Majorana* modes of FIG. 2 on the side of $MM_4$ by adding two additional *Majorana* modes $MM_{2'}$, and $MM_{3'}$, associated with the self-adjoint operators $\hat{\gamma}_2'$, $\hat{\gamma}_3'$.

$g'_E$ denotes the coupling coefficient between $MM_4$ and $MM_{2'}$, and $g'_m$ denotes that between $MM_{2'}$ and $MM_{3'}$.

A qubit is encoded using the four *Majorana* modes $MM_1$, $MM_2$, $MM_{3'}$, and $MM_4$, while the *Majorana* modes $MM_2$ and $MM_3$ are said to be "auxiliary": they are used to prepare, braid and read the state of the qubit, but cannot be used to encode it because they are projected during the braiding operation.

The following Fermionic operators are defined:

$$c_{o'} = \frac{1}{2}(\gamma_1 + i\gamma_{3'});$$

$$c_{m'} = \frac{1}{2}(\gamma_{2'} + i\gamma_{3'})$$

$$c_{e'} = \frac{1}{2}(\gamma_4 + i\gamma_{2'});$$

$$c_{L'} = \frac{1}{2}(\gamma_1 + i\gamma_{2'});$$

$$c_{R'} = \frac{1}{2}(\gamma_{3'} + i\gamma_4)$$

and a base $|n_i, n_j, n_k\rangle$ with i, j, k∈[e', o', m, m', ex, m, L', R', m]

First of all, the system is initialized in a state $$|\Psi_{init}\rangle = |0_{e'} 1_{o'} 1_m\rangle = \frac{1}{\sqrt{2}}(|0_{m'} 1_{ex} 1_m\rangle + |1_{m'} 0_{ex} 1_m\rangle).$$

This thus creates a superposition of two different parities in the subspace associated with the *Majorana* modes $MM_1$-$MM_4$. As $|0_{m'} 1_{ex} 1_m\rangle$ and $|1_m 0_{ex} 1_m\rangle$ belong to different subspaces, they evolve independently during the braiding operation and, even if the system undergoes a projection in each step, this ends up with a superposition of the evolutions of these two states, which acquire different phases.

FIG. 5A illustrates the protocol for carrying out the braiding $\hat{B}_{14}$.

The initialization is performed by modulating the coupling coefficient $g'_E$ at the frequency $\omega_c$ in order to measure the parity $P_{42}$. The braiding itself—represented by an operator $\hat{\Pi}_{23}\hat{B}_{14}$ comprises the modulation of the coupling coefficient $g_L$ at the frequency $\omega_c$; and then the modulation, at the frequency $\omega_d \neq \omega_c$, of the coupling $g_M$ and simultaneously, but with a phase shift, ideally of $\pi/2$, of the coupling $g_R$, and also the application of a resonant excitation $\alpha_{in}$ (at the frequency $\omega_c$) to the input port of the cavity; and then the modulation, at the frequency $\omega_c$, of the coupling coefficient $g_M$. Finally, reading of the parity $P_{3'4}$ completes the protocol; this requires the modulation, at the frequency cod $\omega_d \neq \omega_c$, of the coupling $g_M$ and simultaneously, but with a phase shift, ideally of $\pi/2$, of the coupling $g'_E$, and also the application of a resonant excitation $\alpha_{in}$ (at the frequency $\omega_c$) to the input port of the cavity.

Pulses at the frequencies $\omega_c$ and $\omega_d$ exhibit constant phase relationships. For pulses of different frequencies, the phase relationship is defined at the start of the pulse; for example, carriers at the frequencies $\omega_c$ and $\omega_d$ may be in phase with one another at the initial times of the pulses. This is typically achieved by using an atomic clock to synchronize between the various microwave sources.

FIG. 5B illustrates the protocol for carrying out the braiding $\hat{B}_{41}$, which differs from the previous one only by the order of two operations and which leads to a result of opposite sign to the measurement of the parity $P_{3'4}$.

As in the previous protocol, the initialization is performed by modulating the coupling coefficient g'E at the frequency $\omega_c$ in order to measure the parity $P_{42'}$. The braiding itself—represented by an operator $\hat{\Pi}_{23}\hat{B}_{41}$ comprises the modulation of the coupling coefficient $g_L$ at the frequency $\omega_c$; and then the modulation, at the frequency $\omega_c$, of the coupling coefficient $g_M$; and then the modulation, at the frequency $\omega_d \neq \omega_c$, of the coupling $g_M$ and simultaneously, but with a phase shift, ideally of $\pi/2$, of the coupling $g_R$, and also the application of a resonant excitation $\alpha_{in}$ (at the frequency $\omega_c$) to the input port of the cavity. Finally, reading of the parity $P_{3'4}$ completes the protocol; this requires the modulation, at the frequency $\omega_d \neq \omega_c$, of the coupling $g_M$ and simultaneously, but with a phase shift, ideally of $\pi/2$, of the coupling $g'_E$, and also the application of a resonant excitation $\alpha_{in}$ (at the frequency $\omega_c$) to the input port of the cavity.

FIG. 6 shows, highly schematically, a device according to one embodiment of the invention, implementing the chain of 6 *Majorana* modes of FIG. 4.

The cavity CH is of coplanar waveguide type, obtained by etching a resonator in a superconducting metal film (Goeppl 2008). The frequency of its fundamental mode is typically of the order of 10 GHz.

The cavity has an input port PE at one end and an output port, or read port, PS at the opposite end (in other embodiments, one and the same port may take on both functions). A microwave signal generator GH$_{in}$ is connected to the input port, making it possible to excite a mode of the cavity, while a measurement circuit MES connected to the output port makes it possible to measure at least one quadrature, and preferably both quadratures, of this mode.

A magnet AM generates a stationary magnetic field $B_0$ in the axis of the cavity.

A superconducting electronic device DS is arranged at an antinode of the electric field of the mode of the cavity. This device comprises a semiconductor nanowire NF with strong spin-orbit coupling, electrically insulated from the ground plane of the cavity and oriented parallel to the magnetic field B. The spin-orbit coupling may be intrinsic, as for example in the case of InSb or InAs nanowires, or extrinsic, induced by a magnetic texture of a substrate on which the nanowire (for example a carbon nanotube) is deposited. This nanowire is covered with a superconducting film FS of bandgap $\Delta$ and contacted by 5 electrodes (gates) GR$_1$-GR$_5$ as described in (Cottet 2013); more generally, there are 2N gates to generate 2N *Majorana* modes. The gates should be spaced enough to ensure relatively good localization of the *Majorana* modes (that is to say that the energy $\epsilon_0$ of these modes should be much smaller, for example by a factor of 10 or more, than the bandgap $\Delta$).

The magnetic field B should be strong enough to induce a topological electron phase, at the electrochemical equilibrium potential $\mu$ (in a simple model, $>\sqrt{(g\mu_B B)^2-\Delta^2}$), where g is the Landé factor and $\mu_B$ is the Bohr magneton), but not too strong, so that the cavity is able to remain superconducting.

Voltage generators GT$_i$ i=1–5 (only GT$_5$ is shown) connected to the gates make it possible to locally change the chemical potential of the nanowire, for example to a value of $\mu'$ such that $\mu'<\sqrt{(g\mu_B B)^2-\Delta^2}$) as proposed in (Cottet 2013). It is this chemical potential modulation that allows the *Majorana* modes to appear.

In addition, the gates are connected to microwave signal generators GH$_i$ i=1–5 (only GH$_5$ is shown) via respective bias tees BT. These generators are driven by a processor PR so as to generate a pulse sequence at the frequencies $\omega_d$ and $\omega_c$ of the type described above with reference to FIG. 5A and to FIG. 5B.

As explained above, the pulses have a duration of a few times $1/\kappa$, $\kappa$ being the spectral width of the mode of the cavity, for example $3/\kappa$. Their power is typically of the order of a few milliwatts. The frequency shift between $\omega_d$ and $\omega_c$ is typically between $\kappa$ and $10~\kappa$; it may be for example $5\kappa$.

In addition to braiding, the device of FIG. 6 (and more generally the diagram of FIG. 4) makes it possible to produce a T-gate (also called "$\pi/8$ gate"). To this end, it is enough to simultaneously apply two off-resonance excitations (typically at the frequency $\omega_c$) to two adjacent links of the chain of *Majorana* modes and to simultaneously read the two quadratures of the field at the output of the cavity (which may be achieved through a single measurement in a direction forming angles of 45° with the axes of the IQ plane). For example, in the device of FIG. 6, the excitations may be applied to the gates GR$_4$, GR$_5$ in order to modulate the couplings $g'_E$, $g'_M$ of the diagram of FIG. 4. This is illustrated in FIG. 7.

However, it has been demonstrated in (Karzig 2017) that braiding operations are enough to produce all 1-qubit Clifford gates, as well as a two-qubit entanglement gate denoted W. The set of both makes it possible to produce two-qubit gates between neighboring qubits, including the CNOT gate. In addition, CNOT gates and 1-qubit $\pi/8$ gates are enough to produce a universal computer (Sau 2010). A multi-qubit extension to the device of FIG. 6 or the diagram of FIG. 4, comprising six *Majorana* modes for each qubit, therefore makes it possible to produce a universal quantum computer.

To be able to perform two-qubit operations, it is enough to have a chain of 12 *Majorana* modes—that is to say two subsets of 6 modes each encoding one qubit—and to perform braiding on modes of the two subsets. The invention may therefore serve as a basis for a generic quantum computer.

FIG. 6 constitutes one example of a physical platform for implementing the invention, but it is in no way limiting. Other embodiments are conceivable without departing from the scope of the invention; a strict one-dimensionality of the superconducting electronic device supporting the chain of *Majorana* modes is highly advantageous technologically, but not essential in principle.

REFERENCES (Sato 2017): Masatoshi Sato, Yoichi Ando "Topological superconductors: a review" arXiv:1608.03395v3, 4 Apr. 2017.

(Beenakker 2019): C. W. J. Beenakker "Search for non-Abelian *Majorana* braiding statistics in superconductors" arXiv:1907.06497v1, 15 Jul. 2019.

(Cottet 2013): A. Cottet, T. Kontos, B. Douçot "Squeezing light with *Majorana* fermions" arXiv:1307.4185v4, 12 Nov. 2013.

(You 2014): J. Q. You et al. "Encoding a qubit with *Majorana* modes in superconducting circuits" arXiv: 1108.3712v2, 20 Sep. 2014.

(Vijay 2016): Sager Vijay, Liang Fu "Braiding without Braiding: Teleportation-Based Quantum Information Processing with *Majorana* Zero Modes" arXiv: 1609.00950v1, 4 Sep. 2016.

(Goeppl 2008): M. Göppl et al. "Coplanar Waveguide Resonators for Circuit Quantum Electrodynamics", arXiv: 0807.4094v1, 25 Jul. 2008

(Karzig 2017): T. Karzig et al. "Scalable Designs for Quasiparticle-Poisoning-Protected Topological Quantum Computation with *Majorana* Zero Modes" arXiv: 1610.05289v4, 21 Jun. 2017.

(Sau 2010): J. D. Sau et al. "Universal quantum computation in a semiconductor quantum wire network." arXiv: 1007.4204v3, 24 Nov. 2010.

(Kornich 2020): V. Kornich et al. "Braiding and all quantum operations with *Majorana* modes in 1D", arXiv 14 Sep. 2020 and Physical Review Letters, 126(11), 117701.

The invention claimed is:

1. A quantum computing device comprising:
a microwave cavity (CH) having an input port (PE) and an output port (PS) that are separate or coincident;
a superconducting electronic device (DS) capacitively coupled to the microwave cavity and configured to support a chain of 2N *Majorana* modes ($MM_1$ $MM_4$, $MM_2$, $MM_3$,), N being a positive integer; and
coupling means ($GR_1$-$GR_5$) for applying microwave excitations between each pair of adjacent *Majorana* modes of the chain and
an electronic measurement circuit (MES) suitable for measuring at least one quadrature (I, Q) of a microwave field coming from the output port of the cavity, characterized in that it also comprises at least one microwave signal generator (GHin, GH1-GH5) configured to generate:
microwave pulses at a first frequency resonant with the cavity; and
microwave pulses at a second frequency not resonant with the cavity,
and to selectively apply these pulses to said coupling means and to the input port of the cavity,
wherein N is a multiple of 3, whereby the superconducting electronic device supports at least one group consisting of four *Majorana* modes capable of encoding a qubit (MM1, MM2, MM2', MM3') plus two auxiliary *Majorana* modes (MM2, MM3).

2. The quantum computing device as claimed in claim 1, further comprising an electronic control circuit (PR) configured or programmed to drive the microwave signal generator so as to:
a) apply a first microwave excitation at the first frequency between a fourth and a fifth *Majorana* mode from one end of the chain or from a portion of the chain comprising six *Majorana* modes; and then
b) apply a second microwave excitation at the first frequency between a first and a second *Majorana* mode from said end; and then
c) simultaneously apply a third microwave excitation at the second frequency between the second and a third *Majorana* mode from said end; a fourth microwave excitation at the second frequency between the third and the fourth *Majorana* mode, the third and the fourth microwave excitations exhibiting a phase shift; and a fifth microwave excitation at the first frequency to the input port of the cavity; and then
d) apply a sixth microwave excitation at the first frequency between the second and the third *Majorana* mode; and then
e) simultaneously apply a seventh microwave excitation at the second frequency between the fourth and the fifth *Majorana* mode; an eighth microwave excitation at the second frequency between the fifth and a sixth *Majorana* mode from said end; and a ninth microwave excitation at the first frequency to the input port of the cavity;
the order of operations c) and d) being able to be swapped.

3. The quantum computing device as claimed in claim 2, the electronic control circuit being configured or programmed to drive the electronic measurement circuit so as to measure a component of the microwave field coming from the output port of the cavity in phase with the excitations at the first frequency after the application of each excitation or group of excitations.

4. The quantum computing device as claimed in claim 2, wherein the electronic control circuit (PR) is also configured or programmed to drive the microwave signal generator so as to: simultaneously apply a ninth and a tenth microwave excitation at the second frequency between two adjacent pairs of adjacent *Majorana* modes, and to drive the electronic measurement circuit so as to measure two components of the microwave field coming from the output port of the cavity in phase and in quadrature with the excitations at the first frequency.

5. The quantum computing device as claimed in claim 1, wherein the superconducting electronic device comprises a semiconductor nanowire (NF) exhibiting spin-orbit coupling, placed in correspondence with an antinode of the electric field of a mode (CF) of the cavity and on which a superconducting material (FS) is deposited, the device also comprising a magnet (AM) generating a magnetic field (B) parallel to the nanowire.

6. The quantum computing device as claimed in claim 5, wherein the superconducting electronic device further comprises 2N−1 electrodes ($GR_1$-$GR_5$) for applying electrostatic potentials in order to generate the *Majorana* modes, said electrodes also constituting said coupling means for applying microwave excitations.

7. A method for producing a quantum braiding gate on a qubit by way of a quantum computing device as claimed in claim 1, the electronic control circuit being configured or programmed to drive the electronic measurement circuit so as to measure a component of the microwave field coming from the output port of the cavity in phase with the excitations at the first frequency after the application of each excitation or group of excitations, the method comprising the following steps:
a) applying a first microwave excitation at the first frequency between a fourth and a fifth *Majorana* mode from one end of the chain or from a portion of the chain comprising six *Majorana* modes; and then
b) applying a second microwave excitation at the first frequency between a first and a second *Majorana* mode from said end; and then
c) simultaneously applying a third microwave excitation at the second frequency between the second and a third *Majorana* mode from said end; a fourth microwave excitation at the second frequency between the third and the fourth *Majorana* mode; and a fifth microwave excitation at the first frequency to the input port of the cavity; and then
d) applying a sixth microwave excitation at the first frequency between the second and the third *Majorana* mode; and then
e) simultaneously applying a seventh microwave excitation at the second frequency between the fourth and the fifth *Majorana* mode; an eighth microwave excitation at the second frequency between the fifth and a sixth *Majorana* mode from said end; and a ninth microwave excitation at the first frequency to the input port of the cavity;
the order of steps c) and d) being able to be swapped.

8. The method as claimed in claim 7, further comprising measuring a component of the microwave field coming from the output port of the cavity in phase with the excitations at the first frequency after the application of each excitation or group of excitations.

9. A method for producing a quantum T-gate on a qubit by way of a quantum computing device as claimed in claim 1, the method comprising the following steps:

simultaneously applying two microwave excitations at the second frequency between two adjacent pairs of adjacent *Majorana* modes, and measuring two components of the microwave field coming from the output port of the cavity in phase and in quadrature with the excitations at the first frequency.

\* \* \* \* \*